United States Patent [19]

Dilk

[11] 4,141,569
[45] Feb. 27, 1979

[54] THEFT PREVENTION DEVICE

[76] Inventor: Larry W. Dilk, 2916 W. Sardonyx St., Indianapolis, Ind. 46268

[21] Appl. No.: 823,408

[22] Filed: Aug. 10, 1977

[51] Int. Cl.² .............................................. B60D 1/06
[52] U.S. Cl. .................................................. 280/507
[58] Field of Search ................................. 280/507, 511

[56] References Cited
U.S. PATENT DOCUMENTS

| | | | |
|---|---|---|---|
| 2,641,124 | 6/1953 | Gallagher et al. | 280/507 X |
| 3,884,055 | 5/1975 | Vuillemot | 280/507 X |
| 3,926,456 | 12/1975 | Lundebrek | 280/507 X |
| 4,032,171 | 6/1977 | Allen et al. | 280/507 |

Primary Examiner—Joseph F. Peters, Jr.
Assistant Examiner—Norman L. Stack, Jr.
Attorney, Agent, or Firm—Jenkins, Coffey & Hyland

[57] ABSTRACT

A device for preventing the theft of a towed vehicle having a towing coupler including a coupler cavity adapted to receive a towing ball. The theft prevention device includes a post sized to be received in the coupler cavity, a frame for supporting the post and a cover hingedly attached to the frame and including a second post projecting therefrom for trapping the hitch with the cavity engaged by the towing post when the cover is in a closed position. The frame and cover include first and second locking plates which lie adjacent one another for engagement by the shackle of a padlock when the cover is in a closed position. The frame and cover further define a closure for sheltering the locking plates and the padlock to prevent tampering with the padlock or locking plates when the cover is in the closed position.

11 Claims, 6 Drawing Figures

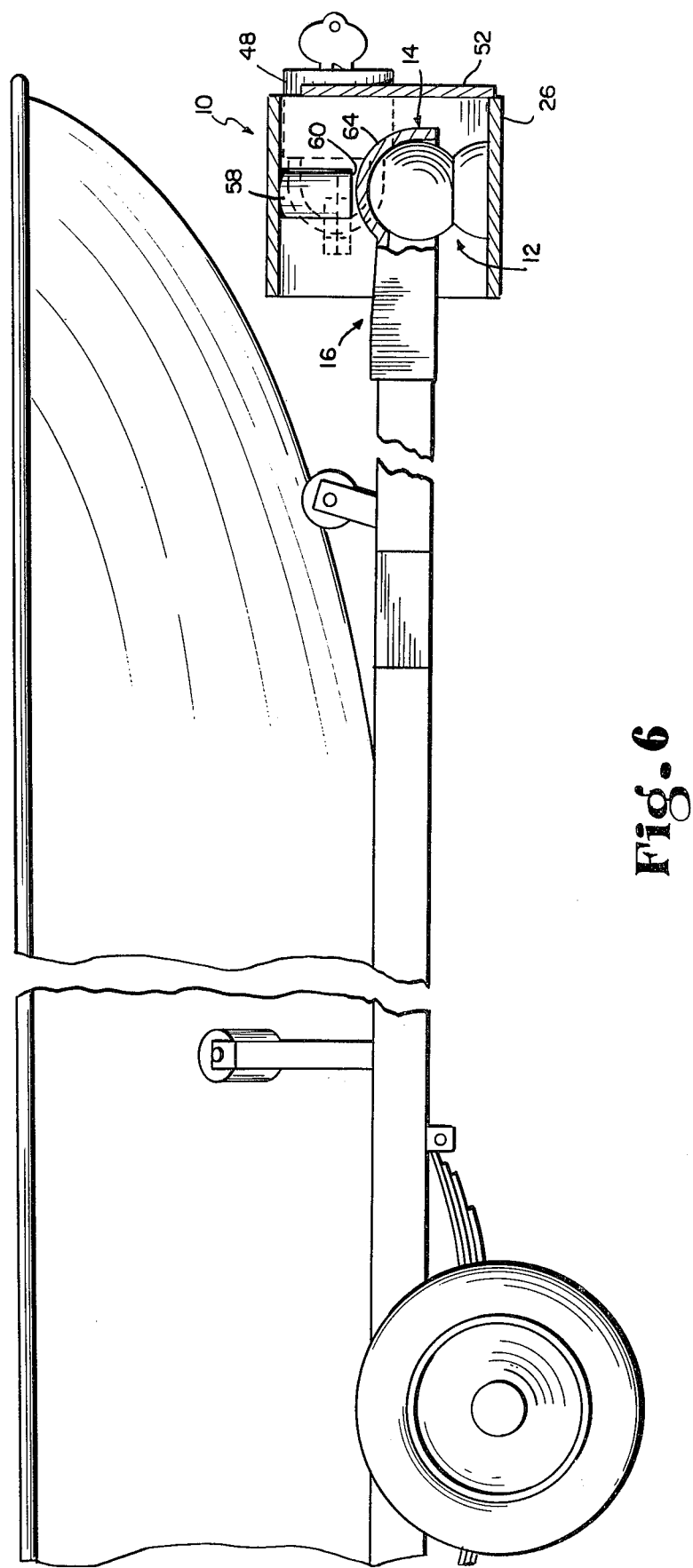

THEFT PREVENTION DEVICE

This invention relates to security and theft-preventing devices, and particularly to a theft prevention device useful with towable vehicles having coupler cavity-type hitches adapted for receiving the coupler posts or balls of towing vehicles.

With the increase in towed leisure vehicles, such as fifth wheels, camping- and travel-trailers, and boat trailers, many people have had the unpleasant experience of having a towed vehicle stolen from them. Anyone who has an automobile or truck equipped with a post- or ball-type hitch capable of fitting into the coupler cavity of such a towed vehicle can attach the towed vehicle to his automobile or truck and drive away with it. Most theft prevention devices to which towed vehicle owners resort provide relatively little real protection, since they can be easily circumvented. For example, many people go to the trouble and expense to have sturdy chains anchored in the ground and secure the chains to their towed vehicles by padlocks, only to discover that a thief can readily cut a padlock or chain of such an arrangement by using heavy-duty bolt-cutters, a hacksaw or other tool.

One type of device which is addressed to the problem of theft of towed vehicles is a trailer lock, available in different sizes for different size towing couplers, from MASTER LOCK COMPANY, Milwaukee, Wis.

It is an object of the present invention to provide an improved theft prevention device for towed vehicles.

According to the invention, a theft prevention device is provided for a towed vehicle having a towing coupler including a coupler cavity adapted to receive a towing post. The theft prevention device includes a post sized to be received in the cavity, a frame supporting the post, the frame including a body and a cover attached to the body by a hinge. The frame includes a side opposite the cover when the cover is in a closed position, the post being located on either the cover or the side opposite the cover so that when the cover is in the open position, the post can be inserted into the coupler cavity, and when the cover is in the closed position, the post cannot be removed from the coupler cavity, and means for locking the cover in the closed position.

According to an illustrative embodiment of the invention, the locking means includes a first locking plate attached to the body of the frame and a second locking plate attached to the cover. The first and second locking plates lie adjacent one another when the cover is in the closed position to permit placement of the shackle of a padlock over both of the locking plates to prevent the cover from being opened without first removing the shackle.

Further according to an illustrative embodiment, means are provided on the frame for defining a protective closure surrounding the locking plates to prevent tampering with the locking plates and the shackle.

Illustratively, the frame includes five generally flat sides in the shape of a box, the one open side for receiving the coupler. The cover, when in the closed position, provides one of the five sides.

According to the illustrative embodiment, the post includes a ball sized to be received in the cavity.

In the illustrative embodiment, the closure has four sides and two opposite open ends, two of the sides being provided by the cover and two of the sides being provided by the body. One of the two open ends provides access to the padlock for actuation to release the shackle and remove it from the locking plates. Desirably, the entire frame including the closure, locking plates and cover, is constructed from heavy metal plate stock to prevent tampering therewith.

According to the illustrative embodiment, the first-mentioned post is mounted on the frame body side opposite the cover and the cover comprises a second post projecting from the cover into close overlying relationship with the first-mentioned post when the cover is in the closed position, sufficient space being provided between the first and second posts for the top of the coupler defining the coupler cavity.

The invention may best be understood be referring to the following description and accompanying drawings which illustrate the invention. In the drawings:

FIG. 6 is a partly longitudinally sectioned, side elevational view of the apparatus of the instant invention after application to a cavity-type hitch, the hitch being illustrated as a hitch on a boat trailer.

In the Figs., certain elements illustrated in broken lines are illustrated to show their positions when the cover of the instant invention is in an open position.

Figure 1:
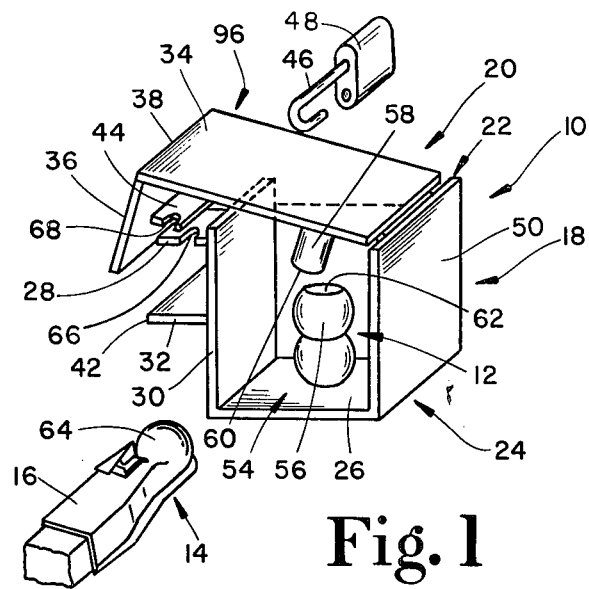
FIG. 1 is a perspective view of the apparatus of the instant invention being applied to a cavity-type hitch, such as is normally found on, for example, a boat trailer or camper trailer.
Figure 2:
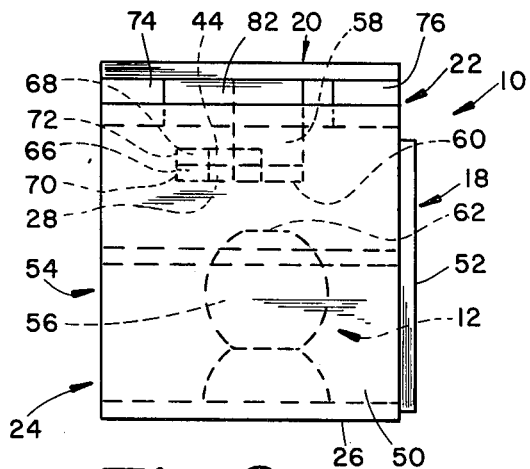
FIG. 2 is a side elevational view of a device constructed according to the present invention.
Figure 3:
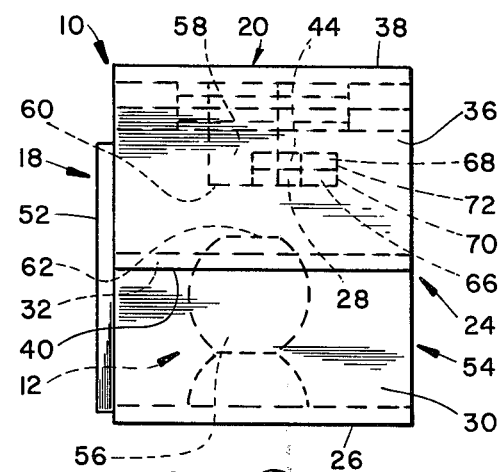
FIG. 3 is a side elevational view of the device of FIG. 1.
Figure 4:
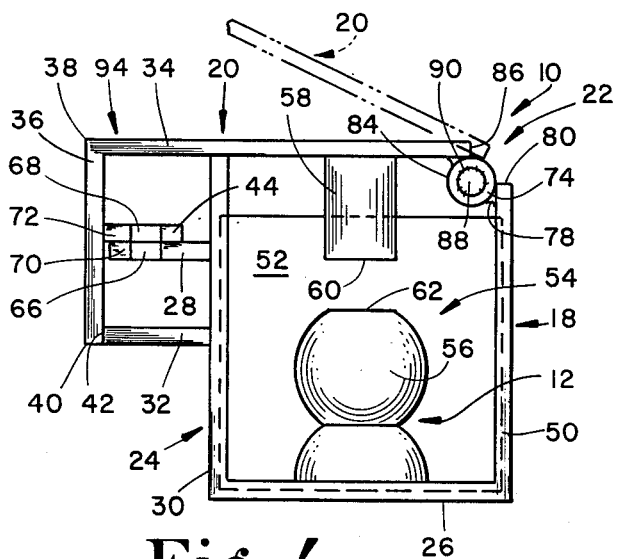
FIG. 4 is a front elevational view of the device of the instant invention.
Figure 5:
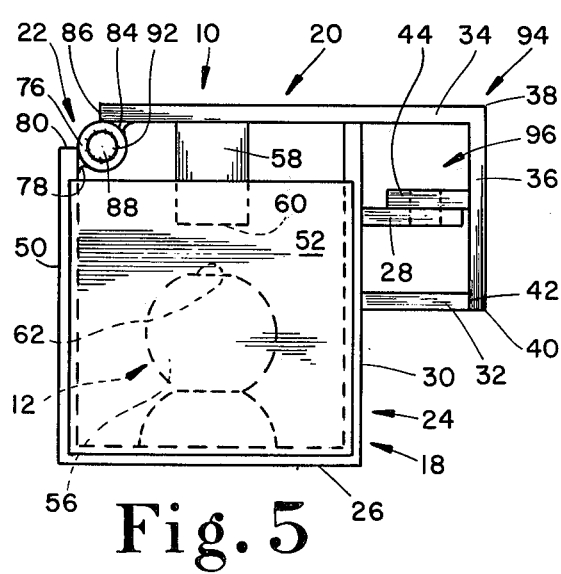
FIG. 5 is a rear elevational view of the device of the instant invention.

Turning now to FIG. 1, the theft prevention device 10 includes a post 12 sized to be received in the cavity 14 of a cavity-type towing coupler 16. Device 10 includes a frame 18 for supporting post 12, the frame having a cover 20 attached by a hinge 22 to the body 24 of the frame.

The frame body 24 provides a side 26 opposite the cover 20 when cover 20 is in a closed position (illustrated in solid lines in FIGS. 2–5). In the illustrated embodiment, post 12 is mounted on side 26 so that when cover 20 is in the open position, post 12 can be inserted into the coupler cavity 14 (see FIG. 1), and when the cover 20 is in the closed position, the post 12 cannot be removed from the cavity 14.

A first locking plate, or keeper, 28 projects outwardly from a side 30 of frame body 24. A closure floor 32 also projects outwardly from side 30 and extends generally parallel to keeper 28 and in spaced-apart relation thereto. Cover 20 includes an overhanging portion 34 which extends beyond side 30 when cover 20 is in its closed position. A closure wall 36 depends from the distal edge 38 of overhanging portion 34, such that when cover 20 is in its closed position, the free edge 40 of closure wall 36 lies adjacent the distal edge 42 of the closure floor 32. A second locking plate, or hasp, 44 projects from the inside of closure wall 36 toward frame side 30 to a sufficient distance that, when cover 20 is in its closed position, keeper 28 and hasp 44 lie adjacent one another to permit placement of the shackle 46 (see FIG. 1) of a padlock 48 over keeper 28 and hasp 44 to prevent cover 20 from being opened without first removing staple 46.

As can best be seen from FIGS. 2-5, frame body 24 also includes a side 50 opposite side 30 and a side 52, sides 26, 30, 50, 52 forming with cover 20 a generally box-like frame structure with one open side 54 which receives the towing coupler 16 (FIG. 1) of the towed vehicle to be protected. Typically, the cavity 14 of such coupler 16 is formed to receive a towing ball of a standard size. Accordingly, post 12 includes a towing ball 56. The cover 20 of the instant arrangement is provided with a second post 58 which projects downwardly from cover 20 into frame body 24 when cover 20 is closed. The bottom 60 of post 58 is in close overlying relationship to the flat top portion 62 of towing ball 56, sufficient space being provided between surfaces 60, 62 for the top portion 64 of coupler 16 above cavity 14 (see FIG. 1).

Each of keeper 28 and hasp 44 includes a slot 66, 68, respectively, which extends toward side 52 of frame body portion 24 from the forward edge 70, 72, respectively, thereof. The slots 66, 68 are provided so that shackle 46 need not be unusually deep to surround keeper 28 and hasp 44. Further, the portions of keeper 28 and hasp 44 which extend beyond shackle 46 when padlock 48 is closed prevent tampering with shackle 46 when the padlock is closed.

Hinge 22 includes a pair of hinge rings 74, 76 welded, as at 78, to the top edge 80 of side 50 and axially aligned with one another. A hinge ring 82 (FIG. 2) is attached, as by welding at 84 (FIGS. 4-5), to edge 86 of cover 20. A hinge pin 88 extends through rings 74, 82, 76 and is welded at both ends as at 90, 92 to the exposed ends of hinge rings 74, 76 to prevent the hinge 22 from being disassembled.

It will be noted that side 30 of frame body 24, overhanging portion 34 of cover 20, closure floor 32 and closure wall 36 form a box-shaped closure 94 (FIGS. 4-5) which protects keeper 28, hasp 44, shackle 46 and the rest of the padlock 48 against damage by rendering access to these elements quite difficult. When the padlock 48 is in place, however, the key cylinder thereof is accessible through open end 96 of closure 94.

In FIG. 6, the longitudinal section through the device 10 and cavity 14 of the towing coupler 16 of a trailer, with the device 10 in a closed orientation on the coupler 16, the post 12 projects into the cavity 14. The bottom 60 of post 58 is disposed in close overlying relationship with the top portion 64 of coupler 16 above cavity 14.

What is claimed is:

1. A theft prevention device for a vehicle having a towing coupler including a coupler cavity adapted to receive a towing post, the theft prevention device comprising a post sized to be received in the cavity, a frame supporting the post, the frame including a cover, means for movably attaching the cover to the body of the frame, the frame further including a side facing the cover, and three intermediate sides extending between the cover and the side facing the cover when the device is in the closed position to surround and effectively to shelter the coupler against tampering, the cover, the side opposite the cover, and the three intermediate sides cooperating to define on the frame one open side to permit the coupler to project into the frame for engagement by the post when the device is in the closed position, the post being located on one of the cover and the side facing the cover so that when the cover is in the open position, the post can be inserted into the coupler cavity, and when the cover is in the closed position, the post cannot be removed from the coupler cavity, and means for locking the cover in the closed position.

2. The invention of claim 1 wherein the locking means includes a first locking plate attached to one of the three intermediate sides and projecting outwardly generally perpendicular thereto and a second locking plate attached to the cover, the first and second locking plates lying adjacent one another when the cover is in the closed position to permit placement of the shackle of a padlock thereover to prevent the cover from being opened without first removing the shackle.

3. The invention of claim 2 and further including means on the frame for defining a protective closure surrounding the locking plates to prevent tampering with the shackle.

4. The invention of claim 3 wherein the closure has four sides and two opposite ends, one of the closure sides being provided by an extension of the cover beyond said one of said three intermediate sides, one of the closure sides being provided by a depending wall on said extension, said depending wall extending generally parallel to said one of said three sides, one of the closure sides being provided by said one of said three intermediate sides, and the other closure side being provided by a projection from said one of said three intermediate sides, one of the two ends being open to provide access to the padlock for actuation to release the shackle and removal of the shackle from the locking plates.

5. The invention of claim 4 wherein the closure, frame and locking plates are constructed from metal plate stock.

6. The invention of claim 1 wherein the post includes a ball.

7. The invention of claim 1 wherein the first-mentioned post is mounted on the side of the frame facing the cover, and the cover comprises a second post projecting from the cover into close overlying relationship to the first-mentioned post when the cover is in closed position, sufficient space being provided between the first and second posts for the towing coupler portion forming the top of the coupler cavity.

8. The invention of claim 1 wherein the means for movably attaching the cover to the frame body comprises a hinge.

9. A theft prevention device for a vehicle having a towing coupler including a coupler cavity adapted to receive a towing post, the device including a post sized to be received in the cavity, a frame including a first side for supporting the post and three upstanding sides adjacent the first side, and a cover for trapping the coupler with the cavity engaged by the towing post, the cover being attached to one of the three upstanding sides for movement between a use position in closed relation to the three upstanding sides and an open position away from the three upstanding sides, one of the three upstanding sides including a first locking plate which projects outwardly therefrom and the cover including an overhanging portion provided with a downwardly depending wall having a second locking plate, the first and second locking plates lying adjacent one another for engagement by the shackle of a padlock when the cover is in a closed position, and said one of the three upstanding walls and cover overhanging portion and downwardly depending wall defining a closure for sheltering the locking plates and the lock to prevent tampering therewith when the cover is in a closed position.

10. A theft prevention device for a towed vehicle having a ball-type hitch cavity, the device comprising a ball of a size sufficient to fit within the hitch cavity, a frame including a box-like body portion for supporting the ball, a cover for the frame, and a hinge for attaching the cover to the frame to provide for movement of the cover between a use position and an open position, the use position for trapping the ball in the hitch cavity and the open position for allowing the ball to be removed from the hitch cavity, and first and second means for locking the cover in the use position on the frame, the frame body supporting the first locking means and the cover supporting the second locking means, the first and second locking means lying adjacent one another for engagement by the shackle of a padlock when the cover is in the use position, and the frame body and cover defining a closure for the padlock and locking means when the cover is in the use position to prevent tampering with the lock and removal of the device from the hitch.

11. A theft prevention device for a vehicle having a towing coupler including a coupler cavity adapted to receive a towing post, the theft prevention device including a post sized to be received in the cavity, a box-like frame for surrounding the coupler when in use position on the coupler, the frame including a first side supporting the post, three intermediate sides and a fifth side opposite the first side, one of the first and fifth sides being hingedly attached to one of the three intermediate sides to permit movement of the hingedly attached side away from the intermediate sides to allow the post to be inserted into, and removed from, the cavity, the frame being open on the sixth side to permit the coupler to project into it, and means for locking the fifth side in its use position adjacent the three intermediate sides to prevent removal of the device from the coupler, the locking means including a first locking plate projecting from one of the three intermediate sides, an extension on said one of said first and fifth sides for projecting beyond said one of said three intermediate sides when the device is in the use position on the coupler, a depending closure wall on the extension, the depending closure wall extending generally parallel to said one of said three intermediate sides when the device is in the use position, said one of said three intermediate sides including a closure floor projecting outwardly from said one of said three intermediate sides into closely spaced relation to the depending closure wall, and a second locking plate on the depending closure wall, the first and second locking plates extending into closely spaced, generally parallel orientation when the device is in the use position on the coupler, the first and second locking plates lying between the extension and closure floor and projecting generally between the depending closure wall and said one of said three intermediate sides when the device is in the use position and the locking plates being adapted to be engaged by a lock shackle effectively to shelter the locking plates, lock and shackle when the device is in the use position on the coupler and the shackle is disposed in locking orientation on the locking plates and the lock is in locked position.

* * * * *